United States Patent Office 3,484,416
Patented Dec. 16, 1969

3,484,416
METHOD OF PREPARING VINYLIDENE CYANIDE - UNSATURATED SULFONIC ACID INTERPOLYMERS
Anthony B. Conciatori, Chatham, and Charles L. Smart, Millington, N.J., assignors to Celanese Corporation, a corporation of Delaware
No Drawing. Continuation-in-part of application Ser. No. 89,122, Feb. 14, 1961. This application Sept. 25, 1964, Ser. No. 399,380
Int. Cl. C08f 9/16, 15/38
U.S. Cl. 260—78.5               11 Claims

ABSTRACT OF THE DISCLOSURE

A method of preparing an interpolymer of vinylidene cyanide and an organic sulfonic acid utilizing as the initial reactants vinylidene cyanide and an alkali metal organic sulfonate and a polymerization catalyst wherein the reaction is effected by substantially removing the alkali metal from the sulfonate and substituting therefor hydrogen ions to form an organic sulfonic acid and effecting the interpolymerization thereafter under acidic, anhydrous conditions. In particular, the reaction is preferably effected utilizing along with vinylidene cyanide another ethylenically unsaturated monomer such as vinyl acetate which is copolymerizable therewith.

---

This is a continuation-in-part of Ser. No. 89,122, filed Feb. 14, 1961, now U.S. Letters Patent 3,180,857.

This invention relates to a novel method for preparing a vinylidene cyanide copolymer. More particularly, this invention relates to a method of preparing a copolymer of vinylidene cyanide and an organic sulfonic acid. A preferred embodiment relates to a method of preparing a terpolymer of vinylidene cyanide, styrene sulfonic acid, and an ethylenically unsaturated monomer copolymerizable therewith, e.g., vinyl acetate.

It is well known that synthetic resinous copolymers of vinylidene cyanide and one or more other monomers copolymerizable therewith exhibit valuable fiber-forming characteristics. Such resinous copolymers of vinylidene cyanide as are contemplated herein generally contain in excess of about 45% of vinylidene cyanide (methylene malononitrile or vinylidene dinitrile) units copolymerized with one or more ethylenically unsaturated monomers such as vinyl acetate or the like, as described in U.S. Patents 2,615,865 through 2,615,880 inclusive 2,628,954, 2,650,911, 2,654,724, 2,654,728, 2,657,197, 2,716,104, 2,716,105, 2,716,106, and 2,740,769 and Canadian Patent No. 569,262.

The copolymers usually comprise units of vinylidene cyanide alternated with one or more copolymerizable monomers selected from the following classes of compounds:

(1) Vinyl esters of aliphatic monocarboxylic acids, preferably of the structure RCOOH, wherein R is an alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued Oct. 28, 1952.

(2) Vinyl esters of the structure

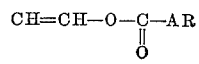

wherein Ar is an aromatic radical in which all the hydrogen atoms are attached to carbon atoms, such as vinyl benzoate; homologs of vinyl benzoate of the formula

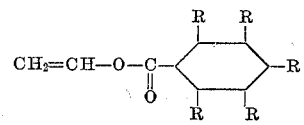

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,615,867, issued Oct. 28, 1952.

(3) Styrene and substituted styrenes of the general formula

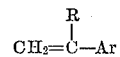

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and paramethoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloromonofluorostyrenes and the like. Copolymerization of vinylidene cyanide with styrene and substituted styrenes is disclosed in U.S. Patent 2,615,868, issued Oct. 28, 1952;

(4) Olefins of the general structure

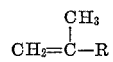

wherein R is an alkyl radical, preferably containing from 1 to 6 carbon atoms, such as isobutylene, (2-methyl propene-1), 2-methyl-butene-1, 2-methylpentene-1, 2,3-dimethylbutene-1, 2,3-dimethyl-pentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in U.S. Patent 2,615,865, issued Oct. 28, 1952;

(5) Alkyl esters of methacrylic acid which possess the structure

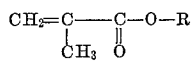

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,-871, issued Oct. 28, 1952;

(6) 2-halogenated monoolefins of the structure

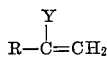

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptane, 2-fluorohexene, 2-fluorobutene, 2-iodopropene, 2-iodopentene, and the like. Copolymerization of these compounds with vinylidene cyanide is disclosed in U.S. Patent 2,615,-877, issued Oct. 28, 1952;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alphabromo propionate, and the like; the copolymerization of all of which with vinylidene cyanide is described in U.S. Patent 2,615,875, issued Oct. 28, 1952;

(8) Vinyl esters of alpha-halo saturated aliphatic monocarboxylic acids of the structure

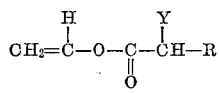

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-iodopropionate, vinyl alpha-bromovalerate and the like. The copolymerization of such monomers with vinylidene cyanide is described in U.S. Patent 2,615,876, issued Oct. 28, 1952;

(9) Vinyl halides such as vinyl chloride, vinyl bromide and the like, which are copolymerized with vinylidene cyanide as described in U.S. Patent 2,615,869, issued Oct. 29, 1952.

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alteranting copolymer when copolymerized with vinylidene cyanide, a large number of which interpolymers are disclosed in U.S. Patent 2,716,106.

Other polymerizable monoolefinic compounds from interpolymers with vinylidene cyanide, in addition to those set out above including, by way of example, the following classes of compounds:

Monoolefinic hydrocarbons, such as 2,3-dimethylhexene-1; 2,3,4-trimethyl-pentene-1; ethylene; propylene; butylene; amylene; hexylene and the like;

Esters of unsaturated acids other than methacrylic, e.g., of acrylic acid and tiglic acid such as methyl acrylate, ethyl acrylate, propyl acrylate, isopropyl acrylate, amyl acrylate, 3,5,5-trimethylhexylacrylate, dodecylacrylate and ethyl tiglate;

Allyl and substituted allyl esters such as allyl chloride, allyl cyanide, allyl bromide, allyl fluoride, allyl iodide, allyl nitrate, allyl thiocyanate, allyl butyrate, allyl benzoate, allyl 3,5,5-trimethyl hexoate, allyl actate, allyl pyruvate, allyl acetoacetae, allyl thioacetate, as well as methallyl esters corresponding to the above allyl esters as well as esters from such alkenyl alcohols as beta-ethyl allyl alcohol, beta-propyl allyl alcohol, and 1-butene-4-ol;

Esters of substituted acrylic acids, such as methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate;

Esters of monoethylenically unsaturated dicarboxylic acids, such as dimethyl maleate, diethyl maleate, dimethyl fumarate and diethyl fumarate;

Monoolefinically unsaturated organic nitriles such as acrylonitrile, methacrylonitrile, 1,1-dicyano propene-1, crotonitrile, oleonitrile and the like;

Monoolefinically unsaturated carboxylic acids such as acrylic acid, methacrylic acid, crotonic acid, butenoic acid, angelic acid, tiglic acid and the like;

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e., approximately 50 mol percent of each.

In order to improve the dyeability of the resultant fibers, the monomers making up the vinylidene cyanide copolymer desirably are copolymerized along with sufficient amounts of an ethylenically unsaturated organic sulfonic acid to produce a copolymer containing about 0.1 to about 30 mole percent of the sulfonic acid component. It should also be noted that vinylidene cyanide: styrene sulfonic acid copolymers can be formed having any desired comonomer ratio. Although terpolymers can be obtained exhibiting a wide range of comonomer units, it is preferred to employ copolymers having from about 49 to about 35 mole percent of vinylidene cyanide units, from about 49 to about 34 mole percent of vinyl acetate units, and from about 0.1 to about 30 mole percent of sulfonic acid units.

Representative sulfonic acids which may be employed include styrene sulfonic acids such as ortho-, meta-, or para-styrene sulfonic acid as well as commercial mixtures thereof; meta- or para-sulfomethyl styrene, mixtures thereof, and substitution products thereof such as poly-sulfo derivatives; β-sulfoethyl methacrylate (isethionic acid ester of methacrylic acid); and like compounds.

Heretofore in attempts to prepare vinylidene cyanide-styrene sulfonic acid interpolymers (by which expression we means to designate both copolymers and terpolymers which additionally contain units derived from an ethylenically unsaturated copolymerizable monomer), an alkali metal sulfonate has been utilized as the source of the styrene sulfonic acid, or a styrene sulfonic acid has been employed which contains therein alkali metal styrene sulfonate. This procedure has not been altogether satisfactory, because the presence of the alkali metal styrene sulfonate in the catalyzed reaction mixture tends to cause homopolymerization of the vinylidene cyanide monomer at the expense of the desired vinylidene cyanide-styrene sulfonic acid interpolymer. Vinylidene cyanide homopolymer is brick red in color, and hence its pressure cannot be tolerated where the characteristic white color of vinylidene cyanide-styrene sulfonic acid interpolymer is desired.

Accordingly, it is an object of this invention to provide an improved method for the preparation of vinylidene cyanide-styrene sulfonic acid interpolymers.

Another object is to provide a method of preparing vinylidene cyanide-styrene sulfonic acid interpolymers without also forming vinylidene cyanide homopolymer.

Additional objects and advantages will become apparent from the following detailed description.

In accordance with one aspect of our invention, we have found that by adding oleum to vinylidene cyanide monomer or to a mixture of vinylidene cyanide and ethylenically unsaturated monomer copolymerizable therewith, and thereafter adding an alkali metal styrene sulfonate, there is no tendency for the vinylidene cyanide monomer to homopolymerize, but rather, there results a true interpolymer of vinylidene cyanide and styrene sulfonic acid. Thus, it appears that although alkali metal styrene sulfonate is added as such to the reaction mixture, the presence of the oleum immediately effects transformation of the sulfonate to the free acid, which acid thereupon interpolymerizes with the vinylidene cyanide (and the ethylenically unsaturated comonomer, if present). The amount of oleum employed should, of course, be equal to or greater than the stoichiometric amount required to acidify the alkali metal styrene sulfonate.

In accordance with another aspect of our invention, the alkali metal styrene sulfonate is subjected to treatment with a specified acidifying compound to thereby remove the alkali metal therefrom and to replace it with hydrogen so as to form styrene sulfonic acid, and such resulting styrene sulfonic acid is then interpolymerized with vinylidene cyanide or a mixture of vinylidene cyanide and an ethylenically unsaturated monomer such as vinyl acetate. The acidifying agent is desirably oleum, anhydrous sulfuric acid, or a solution of anhydrous hydrochloric acid in acetic acid. Naturally, the amount of acid employed is stoichiometric, or slightly in excess of stoichiometric, based on the alkali metal styrene sulfonate.

In accordance with a further aspect of our invention, the alkali metal styrene sulfonte, prior to admixture with the vinylidene cyanide monomer (or mixture of vinylidene cyanide with an ethylenically unsaturated monomer copolymerizable therewith), is subjected to ion exchange treatment utilizing a cation exchange resin under conditions such that the alkali metal is exchanged and replaced with hydrogen ions to form styrene sulfonic acid. Any of the conventional cation exchange resins may be employed herein. In certain instances it may be desirable to combine this embodiment with the preceding embodiment. Thus, first the alkali metal styrene sulfonate is subjected to treatment with one of the previously mentioned acidifying substances to convert it to styrene sulfonic acid. While this conversion is appreciable, it generally will not be 100%, so that residual amounts of alkali metal styrene sulfonate will nevertheless remain. Even in minor quantities, the presence of such alkali metal styrene sulfonate is undesirable in that it may induce a certain amount of homopolymerization of vinylidene cyanide and thereby discolor the resulting product. Accordingly, the product resulting from the foregong acid treatment, which product predominates in styrene sulfonic acid but may contain minor amounts of alkali metal styrene sulfonate, is then subjected to ion exchange treatment, usually by passage through a cation exchange bed. This cation exchange treatment serves to exchange all residual alkali metal and replace it with hydrogen ions.

It is important to note that the interpolymerization of vinylidene cyanide with styrene sulfonic acid must be carried out under anhydrous conditions, and it will be noted that each of the foregoing embodiments relating to the preparation of styrene sulfonic acid is either carried out under anhydrous conditions or else any water that is formed is removed prior to the addition of the styrene sulfonic acid to the reaction mixture containing vinylidene cyanide. Thus, water, if present, exerts an effect similar to that of an alkali metal styrene sulfonate, namely, it causes homopolymerization of vinylidene cyanide at the expense of the desired interpolymerization reaction.

The following examples will further illustrate our invention. All parts are by weight unless otherwise indicated.

Example I

A 10 ml. "standard monomer solution" was prepared containing 47.5 percent vinylidene cyanide, and 10.0 percent of lower alkyl cyanides dissolved in 42.0 percent acetic acid. This solution was maintained at 70° C., and 38 ml. of vinyl acetate and 1 ml. of catalyst solution[1] were added thereto. 12 ml. of anhydrous solution (dried with Linde Sieve) containing 0.5 gram potassium styrene sulfonate in 16 ml. of glacial acetic acid, were added. The reaction mixture immediately turned brick red in color, indicating the formation of vinylidene cyanide homopolymer.

Example II

This example was similar to Example I, with the exception that there was additionally added to the 10 ml. solution of vinylidene cyanide 0.1 ml. of 15 percent fuming sulfuric acid. After maintaining the reaction mixture for one-half hour at 70° C. the resulting product was white (terpolymer of vinylidene cyanide, vinyl acetate and styrene sulfonic acid). It was isolated, washed with vinyl acetate, and then with ethanol. The product was white and soluble at 70° C. in acetonitrile.

Example III

A 40 ml. "standard monomer solution" was prepared as described in Example I and was maintained at 70° C. 0.5 ml. of 15 percent fuming sulfuric acid, 148 ml. of vinyl acetate, and 4 ml. of the catalyst solution described in Example I were added thereto. An anhydrous solution (dried with Linde Sieve) of 2.1 grams of potassium styrene sulfonate in 20 ml. glacial acetic acid was added over a period of 6 minutes. The reaction mixture was maintained at 70° C. for an additional 60 minutes. 8.2 grams of a white product containing 24 percent styrene sulfonic acid, 37 percent vinylidene cyanide, and 39 percent vinyl acetate were isolated after exhaustive washing with vinyl acetate. The polymer flake dyed heavily with Sevron Blue B and showed an I.V. value of 1.4 in gamma-butyrolactone.

Example IV

This example was similar to Example III except that the time for the addition of the solution of potassium styrene sulfonate in glacial acetic acid was increased from 6 to 70 minutes, and the reaction mixture was thereafter held at 70° C. for an additional 75 minutes. This increased the yield of 34.2 grams. The product was soluble in 100 percent acrylonitrile and yielded a clear film. Extraction with boiling distilled water removed 2 percent of this product, which 2 percent analyzed as 58 percent styrene sulfonic acid (calculated from the percent sulfur). The water-insoluble fraction dyed a deep blue with Sevron Blue B, showed an I.V. of 1.7 in gamma-butyrolactone and a styrene sulfonic acid content of 3.1 percent.

Example V

The following recipe was charged into a 1 liter flask equipped with stirrer, dropping funnel, condenser, in-

---

[1] 4 grams of a paste of 50 percent dichlorobenzoyl peroxide-50 percent dibutyl phthalate diluted to 50 ml. solution with chlorobenzene.

side thermometer, and argon inlet tube. The apparatus was previously washed with cleaning solution, water, acetone and flamed dry while in a stream of argon.

"Standard monomer solution" of Example I __ml__ 50
Freshly distilled acetic acid _____gms___ 200.0
Vinyl acetate _____gms___ 192.0
Catalyst solution of Example I _____gms___ 2.5

When the temperature reached 70° C., the catalyst solution was added and the following solution metered in within 60 minutes. This solution was prepared by shaking 2.3 gms. sodium styrene sulfonate in 40 gms. of glacial acetic acid and 17.1 gms. of a 5.25% hydrochloric acid solution in glacial acetic acid for 1 hour and filtering. When polymerization was complete, the finely divided white slurry was filtered and washed 4 times with vinyl acetate and dried. A portion was then extracted in a Soxhlet to determine the water soluble content. Both the non-extracted and extracted samples dyed well when slurried with cationic dyes at 85° C. The samples analyzed as follows:

Water soluble _____percent__ 1–2.2
$SO_4$ _____do____ 1.3–1.5
Mol percent styrene sulfonic acid _____ 1.13–1.3
I.V. _____ 2.7–1.8
Yield _____percent__ 98–100

The polymer was soluble in acetonitrile azeotrope, dimethyl sulfoxide, dimethyl formamide, and gamma-butyrolactone. Films could be cast from the acetonitrile azeotrope that were flexible and clear. These films could be strained with cationic dyes.

Example VI

This example was similar to Example V except that the sodium styrene sulfonate solution was prepared as follows:

2.3 gms. of purified sodium styrene sulfonate (recryst.) were shaken with 52 grams of glacial acetic acid and 5.46 gms. of 10% solution of 100% sulfuric acid in acetic acid. After shaking for 30 minutes to 1 hour, the sample was filtered and added as described in Example V. The properties of the resulting terpolymer were as follows:

Water soluble _____percent__ 1–2
$SO_4$ _____do____ 1.3–1.5
Mol percent styrene sulfonic acid _____ 1.13–1.3
Yield _____percent__ 98–100

Example VII

This example was similar to Example V, except with respect to the treatment of the sodium styrene sulfonate. Thus, pure sodium styrene sulfonate was shaken with glacial acetic acid containing 4% water and filtered. The filtrate was then passed through a column of 200 ml. of ion exchange resin Dowex 50W–X8 that had been throughly washed with glacial acetic acid. The resulting solution was then treated with sufficient acetic anhydride to react with the water present and give a water-free solution of styrene sulfonic acid. The resulting solution assayed for 3.7% free styrene sulfonic acid in acetic acid. An aliquot of 27 ml. of this 3.7% styrene sulfonic acid solution was then fed as described in Example V. The resulting polymer remained white throughout the polymerization and showed no signs of homopolymerization of vinylidene cyanide.

Example VIII

This example illustrates the preparation of a copolymer of vinylidene cyanide and styrene sulfonic acid. A three-necked flask equipped with stirrer, thermometer, condenser topped with drying tube, dropping funnel, and argon inlet tube was dried thoroughly by flaming and then charged with 5.0 gms. of the "standard monomer solution" of Example I and 0.5 ml. of catalyst solution (4.0 gms. dichlorobenzoyl peroxide in 100 ml. of monochlorobenzene).

A solution of 6.8 gms. of sodium styrene sulfonate in 80 ml. of glacial acetic acid was acidified with 1.5 ml. of 100% sulfuric acid and 0.1 ml. of 15% oleum, shaken for 30 minutes and filtered. This was added to the foregoing solution and heated to 70° C. A smooth white dispersion formed as the polymerization proceded. When the polymerization was complete, the polymer was filtered and washed with glacial acetic acid and then three times with vinyl acetate. The composition of the white polymer was as follows:

Percent
Mol styrene sulfonic acid charged _____ 50
Mol styrene sulfonic acid found _____ 66

Variations can, of course, be made without departing from the spirit of our invention as embodied in the foregoing specification.

The embodiments of the invention in which an exclusive property or privilege is claimed are defined as follows:

1. In a method of preparing an interpolymer of vinylidene cyanide and an unsaturated copolymerizable organic sulfonic acid, this method utilizing as the initial reactants vinylidene cyanide, an alkali metal unsaturated organic sulfonate, and a polymerization catalyst therefor, the improvement comprising reacting the alkali metal of said sulfonate with at least a stoichiometric equivalent of hydrogen ions to form an unsaturated organic sulfonic acid, and polymerizing said vinylidene cyanide with from about 0.1 to 30 mole percent of said organic sulfonic acid under acidic anhydrous conditions.

2. The method of claim 1 wherein there is interpolymerized, along with said vinylidene cyanide and said organic sulfonic acid, an ethylenically unsaturated monomer copolymerizable therewithin.

3. The method of claim 2 wherein said ethylenically unsaturated monomer is vinyl acetate.

4. In a method of preparing an interpolymer of vinylidene cyanide and styrene sulfonic acid, this method utilizing as the initial reactants vinylidene cyanide, an alkali metal styrene sulfonate, and a polymerization catalyst therefor, the improvement comprising reacting the alkali metal of said styrene sulfonate with at least a stoichiometric amount of hydrogen ions to form styrene sulfonic acid, and polymerizing said vinylidene cyanide with from about 0.1 to 30 mole percent of said styrene sulfonic acid under acidic anhydrous conditions.

5. The method of claim 4 wherein there is interpolymerized, along with said vinylidene cyanide and said styrene sulfonic acid, an ethylenically unsaturated monomer copolymerizable therewith.

6. The method of claim 5 wherein said ethylenically unsaturated monomer is vinyl acetate.

7. The method of claim 6 wherein the monomers are employed in an amount such as to result in a terpolymer containing from about 49 to about 35 mole percent of units derived from vinylidene cyanide, from about 49 to about 34 mole percent units derived from said vinyl acetate, and from about 0.1 to about 30 mole percent units derived from said styrene sulfonic acid.

8. The method of claim 4 wherein there is introduced into a reaction zone containing said vinylidene cyanide and said polymerization catalyst, oleum, and thereafter introducing said alkali metal styrene sulfonate, whereby said salt is transformed into styrene sulfonic acid and interpolymerization is effected.

9. The method of claim 4 wherein said alkali metal styrene sulfonate is subjected to treatment with a compound selected from the group consisting of oleum, anhydrous sulfuric acid, and a solution of anhydrous hydrochloric acid dissolved in acetic acid, to thereby remove said alkali metal from said styrene sulfonate and substitute hydrogen ions therefor to form styrene sulfonic acid, and thereafter admixing said resulting styrene sulfonic acid with said vinylidene cyanide and said polymerization catalyst.

10. The method of claim 4 wherein said alkali metal styrene sulfonate is subjected to ion exchange with a cation exchange resin under conditions such that the alkali metal is removed and replaced with hydrogen ions to form styrene sulfonic acid, and thereafter admixing said resulting styrene sulfonic acid with said vinylidene cyanide and said polymerization catalyst.

11. The method of claim 1 wherein the interpolymerization is effected as a dispersion in acetic acid.

References Cited

UNITED STATES PATENTS

| | | | |
|---|---|---|---|
| 3,243,415 | 3/1966 | Webb | 260—79.7 |
| 2,837,501 | 6/1958 | Millhiser | 260—79.3 |

JAMES A. SEIDLECK, Primary Examiner

U.S. Cl. X.R.

8—55; 260—30.8, 32.4, 32.6, 79.3

PO-1050
(5/69)

UNITED STATES PATENT OFFICE
CERTIFICATE OF CORRECTION

Patent No. __3,484,416__          Dated __December 16, 1969__

Inventor(s) __Anthony B. Conciatori and Charles L. Smart__

It is certified that error appears in the above-identified patent and that said Letters Patent are hereby corrected as shown below:

In column 3, line 75, "from" should be --- form ---.

In column 4, line 15, "acetate" should be --- lactate ---.

In column 4, line 58, after "thereof", the word --- ortho- --- should be inserted.

In column 5, line 46, "sulfonte" should be ---sulfonate---.

In column 8, claim 2, the last word should be --- therewith ---.

Signed and sealed this 9th day of May 1972.

(SEAL)
Attest:

EDWARD M. FLETCHER, JR.
Attesting Officer

ROBERT GOTTSCHALK
Commissioner of Patents